Aug. 7, 1934.   J. D. KURZ   1,969,486
SHAKER
Filed June 13, 1932
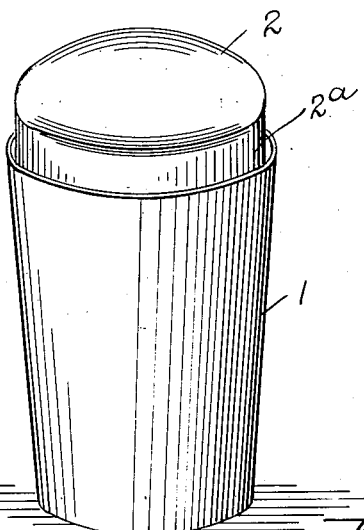
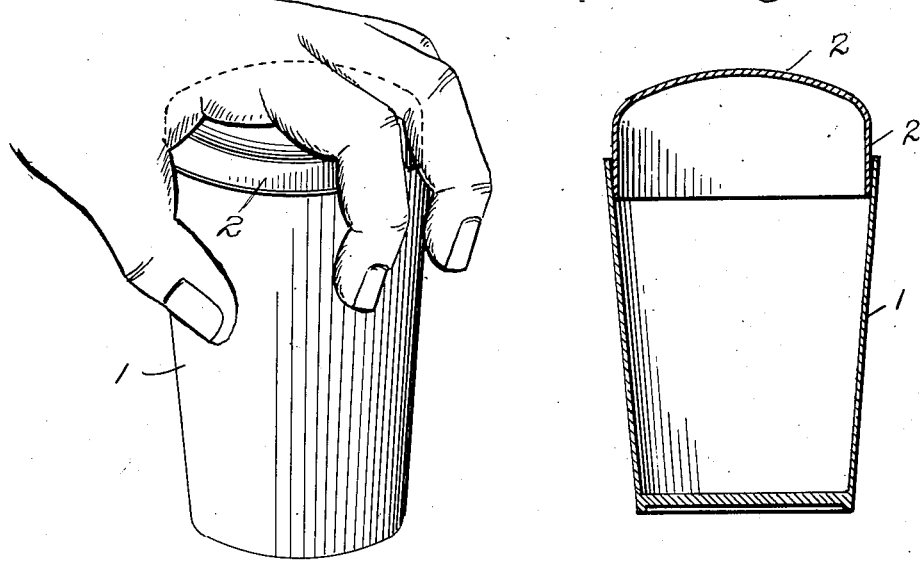

Patented Aug. 7, 1934

1,969,486

UNITED STATES PATENT OFFICE 1,969,486

SHAKER

Juliet D. Kurz, Dayton, Ohio

Application June 13, 1932, Serial No. 616,964

3 Claims. (Cl. 259—72)

This invention relates to covered receptacles, and particularly to a beverage shaker and the like.

The present shaker receptacle is preferably molded from one or another of the commercial synthetic resinous plastics or molding compounds, and comprises a vessel and a separable closure dome fitting interiorly of the mouth of the vessel, the closure being of such proportions as to permit the vessel to be grasped over the closure which is contoured to comfortably, but securely, abut upon the palm of the operator's hand, and enable one hand manipulation of the shaker.

The object of the invention is to provide a shaker device which will not only be inexpensive to manufacture, but will be more convenient to handle and manipulate, and adapted for one hand manipulation, pleasing in appearance and simple in construction.

A further object of the invention is to provide a closure cap for a receptacle adapted to make a secure leak tight joint with a receptacle without the necessity of special connections or coupling means.

A further object of the invention is to provide a device of the character described adapted to be easily and cheaply molded from commercial molding plastics.

A further object of the invention is to provide a shaker construction wherein the walls of the vessel or those of the closure, or both, are of sufficiently yielding character, without being unduly flexible, to insure a leak tight joint between the parts.

A further object of the invention is to provide a shaker device embodying the features of construction, adaptability and desirable characteristics, as hereinafter described.

With the above primary and other incidental objects in view, as will more fully appear in the specification, the invention consists of the features of construction, the parts and combinations thereof, and the mode of operation, or their equivalents, as hereinafter described and set forth in the claims.

In the drawing, wherein is shown the preferred but obviously not necessarily the only form of the embodiment of the invention, Fig. 1 is a perspective view of the beverage shaker, forming the subject matter hereof. Fig. 2 is a vertical sectional view of the vessel and its closure dome. Fig. 3 is a perspective view illustrating how the shaker vessel may be conveniently grasped for one-hand manipulation and the closure dome securely held in its adjusted position by the pressure of the operator's hand.

Like parts are indicated by similar characters of reference throughout the several views.

In the drawing, 1 is a vessel or receptacle of the tumbler type, having tapering side walls and which is preferably, though not necessarily, formed from a commercial synthetic resinous molding plastic of which there are numerous varieties available. Such material, while capable of being easily and inexpensively molded, is available in different colors and is subject to various delineations of surface design. Thus receptacles or vessels of molded plastic are not only pleasing in appearance, but the walls of such vessels are capable of a limited degree of deflection or distortion under pressure which enables the closure to be tightly fitted thereto.

The closure cap 2 is preferably of a rounded or convex dome shape, having relatively thin walls, and is preferably, though not necessarily, molded from material similar to that of the vessel or receptacle 1. The dome shaped closure 2 is formed with a rounded concavo-convex top and with substantially cylindrical side walls 2a. Such closure dome 2 is adapted to fit interiorly of the flaring or inclined side walls of the vessel 1 which they meet at an acute angle, as is clearly shown in Fig. 2. In this position, the margin of the closure dome 2 exerts a slight wedging action within the flaring walls of the vessel 1 by which the walls of the respective members are flexed or yieldingly distorted into accurate agreement with each other.

In ordinary commercial production, and especially when manufactured to sell in a comparatively low price, it is not commercially possible to make every piece with such accuracy that the vessels and tops will be interchangeable nor to specially fit tops and vessels to each other. Therefore, the limited degree of flexibility or yielding characteristic of vessels and covers formed from molding plastics of synthetic resinous character, and which may initially be slightly out of round, are enabled to yield by contraction of the walls of the closure dome 2 and corresponding expansion of necessary portions of the flaring walls of the vessel 1 until such parts accurately conform to each other to afford a leak tight joint.

The closure dome 2 is of such proportion that it extends but a short distance beyond the top of the vessel 1 and thus enables the vessel to be grasped within the operator's hand over the closure dome 2 as is illustrated in Fig. 3. The top of the closure dome 2 being rounded comfortably conforms to the interior of the operator's palm against which it abuts while the vessel is being grasped, as shown in Fig. 3, whereby sufficient pressure can be applied to maintain a tight joint between the cover and vessel. By molding the vessel and the closure dome from material of different color or by providing surface ornamentations upon the vessel and closure, the device can be given a quite attractive appearance.

Although synthetic resinous plastics or molding compound is the preferable material and the one adopted for commercial production, it is to be understood that the invention is not limited to the use of such material, but the device may be made of metal, glass or other suitable materials. Also while direct contact of the closure dome 2 with the interior of the vessel walls is the preferable construction, it will be understood that the margin of the closure may be coated with suitable sealing material or a sealing gasket may be interposed between the parts. Since such features, per se, form no part of the present invention, they have not been illustrated.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction disclosed comprise the preferred form of several modes of putting the invention into effect, and the invention is therefore claimed in any of its forms or modifications within the legitimate and valid scope of the appended claims.

Having thus described my invention, I claim:

1. As an article of manufacture, a beverage shaker including a vessel of molded synthetic resinous compound having flaring side walls of uniform thickness possessing a limited degree of flexibility, and a closure therefor of convex dome shape, also of molded synthetic resinous material, having substantially cylindrical side walls and possessing a limited degree of flexibility, said closure fitting within the open mouth of the vessel and marginally engaging the interior flaring surface thereof at an acute angle adjacent to the top thereof, the convex top of the closure extending but a short distance above the walls of the vessel and adapted to comfortably conform to and abut the palm of the operator's hand when grasping the top portion of the vessel over said closure.

2. As an article of manufacture, a beverage shaker including a vessel having flaring side walls, and a rounded dome shaped closure therefor, including a convex top which merges into the side walls thereof through a rounded contour without abrupt change of direction, to comfortably conform to the hand of an operator, the side walls of the closure seating interiorly of the flaring side walls of the vessel in marginally intersecting relation therewith, and with the convex top of the closure extending such limited distance thereabove as to firmly abut the palm of the operator's hand when grasping the upper portion of the vessel over the closure for one hand manipulation.

3. As an article of manufacture, a beverage shaker including a vessel having flaring side walls and a dome shaped closure therefor having a rounded convex top and substantially cylindrical side walls merging smoothly into the rounded top, and of such diameter as to fit within the flaring interior of the vessel in acute angular marginally intersecting relation with the flaring vessel walls, with the convex top projecting less than finger length therebeyond for pressure engagement of the palm of the operator's hand while grasping the upper portion of the vessel over such closure for one hand manipulation.

JULIET D. KURZ.